United States Patent
Szybek et al.

(10) Patent No.: US 10,295,408 B2
(45) Date of Patent: May 21, 2019

(54) RAMAN SPECTROSCOPY SYSTEM

(71) Applicant: SERSTECH AB, Lund (SE)

(72) Inventors: Katja Szybek, Lund (SE); Jan Sonnvik, Degeberga (SE)

(73) Assignee: SERSTECH AB, Lund (SE)

(*) Notice: Subject to any disclaimer, the term of this patent is extended or adjusted under 35 U.S.C. 154(b) by 0 days.

(21) Appl. No.: 15/578,757

(22) PCT Filed: Jun. 1, 2016

(86) PCT No.: PCT/EP2016/062398
§ 371 (c)(1),
(2) Date: Dec. 1, 2017

(87) PCT Pub. No.: WO2016/193315
PCT Pub. Date: Dec. 8, 2016

(65) Prior Publication Data
US 2018/0299328 A1    Oct. 18, 2018

(30) Foreign Application Priority Data
Jun. 1, 2015    (SE) ........................... 1550706

(51) Int. Cl.
*G01J 3/44* (2006.01)
*G01J 3/02* (2006.01)
*G01J 1/02* (2006.01)

(52) U.S. Cl.
CPC ............... *G01J 3/44* (2013.01); *G01J 1/0266* (2013.01); *G01J 3/0208* (2013.01);
(Continued)

(58) Field of Classification Search
CPC .......... G01J 3/44; G01J 3/0208; G01J 3/0237; G01J 3/262; G01J 2003/4424; G01N 21/65
See application file for complete search history.

(56) References Cited

U.S. PATENT DOCUMENTS 6,008,894 A * 12/1999 Schmucker ............... G01J 3/44
356/300
2010/0034743 A1    2/2010 Cohen et al.
(Continued)

FOREIGN PATENT DOCUMENTS

GB        2506528        4/2014
JP        2007042981     2/2007

OTHER PUBLICATIONS

PCT/EP2016/062398; PCT International Search Report and Written Opinion of the International Searching Authority dated Dec. 8, 2016.

*Primary Examiner* — Maurice C Smith
(74) *Attorney, Agent, or Firm* — Renner, Otto, Boisselle & Sklar, LLP

(57) ABSTRACT

A spectroscopy system (10) for analyzing in-elastic scattered electromagnetic radiation from an object being irradiated by electromagnetic radiation is provided. The system comprises a tunable lens assembly (13) having a tunable lens provided in the beam path between an electromagnetic radiation source (11) and the object (O) and arranged to project a beam of electromagnetic radiation emitted from the electromagnetic radiation source onto an area of the object and receive and collimate the in-elastic scattered electromagnetic radiation from the object. Based on electromagnetic radiation detected by at least a first detector (121) a control unit (14) is capable making a decision to change the operational settings of the tunable lens.

19 Claims, 6 Drawing Sheets

(52) U.S. Cl.
CPC ........... *G01J 3/0237* (2013.01); *G01J 3/0262* (2013.01); *G01J 3/0289* (2013.01); *G01J 2003/4424* (2013.01)

(56) References Cited

U.S. PATENT DOCUMENTS

| | | |
|---|---|---|
| 2010/0099583 A1 | 4/2010 | Cho |
| 2011/0261354 A1 | 10/2011 | Sinfield et al. |
| 2012/0044487 A1 | 2/2012 | Carron et al. |
| 2014/0204376 A1 | 7/2014 | Day |

* cited by examiner

RAMAN SPECTROSCOPY SYSTEM

This application is a national phase of International Application No. PCT/EP2016/062398 filed Jun. 1, 2016 and published in the English language, and claims priority to Swedish Application No. 1550706-4 filed Jun. 1, 2015. Which are both herein incorporated by reference in their entirety.

TECHNICAL FIELD

The present invention relates generally to the field of spectroscopy. More particularly, it relates to improved Raman spectroscopy.

BACKGROUND

Raman spectroscopy is a certain spectroscopy technique that enables observation of vibrational, rotational, and other low frequency modes in a system. Raman spectroscopy is common practice in e.g. in the field of chemistry in order to provide a fingerprint by which different molecules may be identified.

Raman spectroscopy typically provides information about molecular vibrations that may be used for identification or quantification of a material which a sample is made up of. The sample is typically illuminated by an electromagnetic radiation source such as a laser or LED having monochromatic light. The light incident on the sample is scattered, absorbed or transmitted. The majority of the scattered light is typically in the same frequency as the light source, this is typically known as Rayleigh or elastic scattering i.e. the energy is conserved. Typically, a very small amount, typically in the range of $10^{-5}\%$ of the incident light intensity, is scattered by Raman scattering or inelastic scattering, i.e. the energy is not conserved resulting in a shift in wavelength of the scattered light.

A Raman spectrum of the sample may be obtained by plotting the intensity of the shift of wavelength versus the frequency.

Raman spectroscopy is a well-established spectroscopic technique for rapid identifications of chemicals with high degree of accuracy. Every material will give rise to a unique Raman spectrum, which is why the technique is suitable for identifying materials.

The Raman effect typically occurs when focused monochromatic (laser) light interact with vibrational modes of molecules comprised in a sample are illuminated. Light scattered from the molecules gives rise to a vibrational spectrum that typically consists of a series of lines constituting a molecular "fingerprint".

Raman instruments typically are common in pharmaceutical laboratories.

The continued miniaturization of electronic components has furthermore led to the production of portable and handheld Raman instruments used for hand measurements of liquids, powders and solids.

The optical module of Raman instruments generally consists of three main parts: an excitation source, e.g. typically a laser, a sampling device, e.g. typically an optical probe, and a spectrometer or detector. Optical probes typically deliver the laser radiation to the sample and transmit backscattered Raman radiation from the sample to the spectrometer.

Typically, there are three general types of the optical probe geometries, remote sampling probes using fiber optics, conventional sampling probes with free-space radiation path and Raman imaging probes—which is a combination of a Raman spectrometer with a microscope.

The first reported Raman probe was a remote sampling probe by McCreery et. al in U.S. Pat. No. 4,573,761. The probe head was a bundle of three optical fibers where the central fiber was used to deliver laser beam to the sample and two others to collect Raman light from the sample. The laser beam was divergent and the efficiency of Raman photons was poor. Many improvements to the McCreery probe were done to increase collection efficiency.

Conventional sampling probes may typically remove the fiber-background and optimize light throughput by integrating a lens system and a light-filtering material on the free-space laser and collection paths. These probes typically use 180° or 90° geometries.

There are several variations to both geometries. In some applications the angle between the laser and collection axis exceeds or is less than 90°, whereas some applications use parallel axis for excitation and collection radiation.

The 180° probe configuration has become quite common in commercial Raman instruments and has many advantages. For example, the working distance between the collection lens and the sample can be up to several centimeters, which typically makes Raman sampling through a vial possible. Since laser and collection light pass through the same surfaces, curved vials or bottles can be tolerated.

However, the sample alignment is a common problem for both geometries because the laser focus position on the sample is strongly affected by the Raman signal strength.

Different sampling geometries have different sensitivity to the focus. For example, the Raman microscopes obtain spectra from a very small sample region (a few microns in depth and 1 µm laterally) and is typically extremely sensitive to focus position—a few microns of motion along the optical axis can reduce signal by half or more.

US 2014/0221753A1 discloses an objective lens arrangement for confocal endomicroscopy. Here, an imaging arrangement can be configured to generate a microscopic image of the anatomical structure(s), wherein the imaging arrangement can include a variable focus lens, and can be provided in the housing arrangement.

Furthermore, the Raman spectrometer sensitivity is related to the spot size and to the sampling area size. A small focus spot is desired to achieve high sensitivity but this also reduces the sampling area, which is an issue for non-uniform or non homogenous samples. This problem has been addressed by rooter- and beam scanning techniques such as described in U.S. Pat. No. 8,310,669 and/or US20120162642A1.

A typical problem for all conventional probes is stray light caused by the inner mechanical structure of the probes.

The Raman spectroscopy is based on inelastic scattering, i.e. the kinetic energy of an incident particle is not conserved, or on Raman scattering, i.e. the inelastic scattering of a photon. The scattering is typically induced by light in the form of a laser beam typically in the visible, near infrared, or near ultraviolet range.

Typically, a sample is illuminated with a laser beam having high laser power density. The electromagnetic radiation form the illuminated spot of the sample is the collected with a lens and sent through a monochromator. Typically, elastic scattered radiation is filtered out, while the rest of the collected light is dispersed onto a detector through a filter.

The high laser power density typically used in Raman spectroscopy provides problems with the technique. As it is common to illuminate small areas of a sample in Raman spectroscopy the high laser power density typically leads to massive heat development in the sample which may severely damage the sample. Putting a large amount of energy into the sample could also lead to other dangers, e.g. in the case of potentially explosive substances.

Another typical problem that limits the use of Raman spectroscopy in investigation of colored samples is fluorescence and Raman emission from the fiber core itself that hide the, in this context, very weak Raman signal.

Another problem is that especially black and brown-colored samples experience localized heating if the laser power density is too high. This can generally be observed in Raman spectra as a broad sloping background overlying the Raman spectrum because of blackbody radiation making it difficult to actually discern the scattering from surrounding noise.

Thus, there is a need for new and improved systems for achieving Raman spectroscopy.

SUMMARY

In order to mitigate some or all of the above mentioned set backs the inventors have realized after insightful reasoning that this may be achieved according to a first aspect.

According to a first aspect, a system for analyzing in-elastic scattered electromagnetic radiation from an object being irradiated by electromagnetic radiation is provided. The system comprises an electromagnetic radiation source for emitting electromagnetic radiation onto the object. The system further comprises at least one detector for detecting at least part of the in-elastic scattered electromagnetic radiation from the object, the detector is arranged in a spectrograph unit for detecting a wavelength spectrum of in-elastic scattered electromagnetic radiation from the object. Moreover, the system comprises a tunable lens assembly comprising a tunable lens provided in the beam path between the electromagnetic radiation source and the object and arranged to project a beam of electromagnetic radiation emitted from the electromagnetic radiation source onto an area of the object and receive and collimate the in-elastic scattered electromagnetic radiation from the object. A control unit is connected to the tunable lens, and arranged to control the optical characteristic operation setting of the tunable lens assembly by imposing a first setting control operation signal to the tunable lens assembly, wherein the first setting control operation signal comprising information relating to a first focal length, first beam shape, and/or first beam position attainable. The control unit is further connected to the at least one detector for receiving at least a first spectrum of the in-elastic scattered electromagnetic radiation from the object while using the first setting of the tunable lens assembly. The control unit is arranged to analyze the detected portion of in-elastic scattered electromagnetic radiation by comparing an optical characteristic of the first spectrum to a reference and decide whether the first setting should be changed to a second setting of the tunable lens assembly. In the event a decision to change the first setting to a second setting is taken the control unit is further configured to transmit a second setting control operation signal associated with the second setting to the electrically tunable lens assembly, wherein the second setting comprises information relating to a second focal length, second beam shape and/or second beam position attainable by the tunable lens assembly. The decision to change to a second setting of the tunable lens assembly is based on:

the presence of a first level of fluorescence being higher than a predetermined threshold in the first spectrum, whereby the second setting is associated with an increased beam shape compared to that of the first setting, the presence of a second level of fluorescence being lower than the predetermined level in the first spectrum, whereby the second setting is associated with a decreased beam shape compared to that of the first setting, or the presence of no fluorescence or a third level of fluorescence being lower than the second level, whereby the second setting is associated with a second focal length or second beam position.

According to a second aspect a system for analyzing in-elastic scattered electromagnetic radiation from an object being irradiated by electromagnetic radiation is provided. The system comprises an electromagnetic radiation source for emitting electromagnetic radiation onto the object. The system further comprises at least one detector for detecting at least part of the in-elastic scattered electromagnetic radiation from the object, the at least one detector is arranged to detect a level of electromagnetic radiation scattered from the object towards the electromagnetic radiation source. Moreover, the system comprises a tunable lens assembly comprising a tunable lens provided in the beam path between the electromagnetic radiation source and the object and arranged to project a beam of electromagnetic radiation emitted from the electromagnetic radiation source onto an area of the object. A control unit connected to the tunable lens, and arranged to control the optical characteristic operation setting of the tunable lens assembly by imposing a first setting control operation signal to the tunable lens assembly, wherein the first setting control operation signal comprises information relating to a first focal length, beam shape, and/or beam position attainable. The control unit is further connected to the at least one detector for receiving at least a portion of the in-elastic scattered electromagnetic radiation from the object while using the first setting of the tunable lens assembly. The control unit is arranged to analyze the detected portion of in-elastic scattered electromagnetic radiation by comparing an optical characteristic of the detected portion to a reference set at a level above which the durability of the electromagnetic radiation source is adversely affected. In the event the optical characteristic is larger than the reference the control unit is arranged to transmit a second setting control operation signal to the tunable lens assembly. The second setting control operation signal comprises information relating to a second focal length, second beam shape and/or second beam position to reduce the magnitude of the optical characteristic detected by the detector when the electrically tunable lens assembly operates based on the second setting.

An advantage of some embodiments is that optimized Raman spectroscopy may be performed without risking damage to the sample being illuminated.

Another advantage of some embodiments is minimal fluorescence may be achieved while still keeping optimal scattering and detecting results.

A further advantage of some of the embodiments is that only one system is needed and that focus of the light may be changed automatically or by a remote user in order to fit the sample to be illuminated.

Yet another advantage of some of the embodiments is that a larger sample area than previously may be monitored, and thus more information about the sample may be gained.

Another advantage of some of the embodiments is that the laser focus may be automatically tuned to the most optimal position for providing highest Raman signal strength.

A further advantage of some of the embodiments is that different layers of a sample may be studied and identified.

Another advantage of some of the embodiments is that the laser spot size on the sample may be dynamically and automatically varied.

Another advantage of some of the embodiments is that it is possible to collect a maximum of scattered light at a minimum of laser irradiation.

Yet another advantage of some of the embodiments is increased ease of integration of the system with external sampling probe systems which already have a fixed optical setup.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
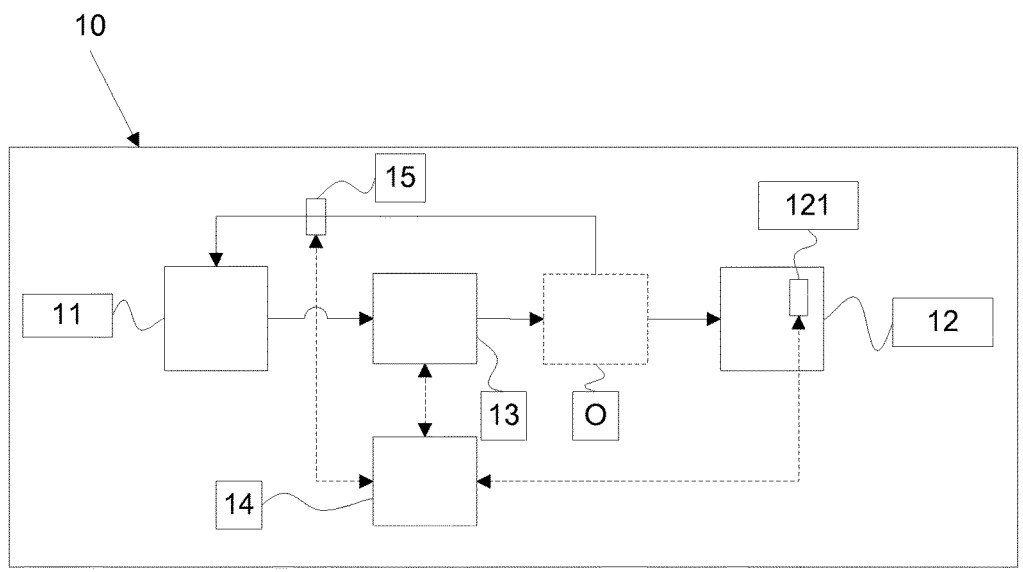
FIG. 1 is a schematic drawing showing a spectroscopy system according to an embodiment.

In prior art a sample is rigged in a system comprising an irradiation source, filters, lenses and a detector. The sample is then illuminated by the irradiation source whose light is directed through filters and lenses. The scattered light is then detected by the detector which collects data for the Raman spectrum.

However, as different materials have different properties, different focuses of the illuminating light may be desirable. Furthermore, Raman spectroscopy is inhibited in that the level of fluorescence easily gets too high during illumination, which level also is dependent on the focus point of the irradiation light on the sample.

A solution to this problem is to either control the laser spot-size or the laser power. When using a fixed spot size, it is advantageous to allow continuous control of the laser power and to begin acquisition at a lower power at the expense of increasing integration time. When using a fixed power, a larger spot size may be used, but at the expense of reduced sensitivity. The challenge is to allow the spot size to vary by changing the focal length of the laser focus lens as described further in detail below.

As the Raman signal is quite weak it is easily obscured in fluorescence and background noise. To achieve a stronger Raman signal, a higher frequency of irradiation should preferably be used. A higher frequency typically leads to a higher level of fluorescence.

The present inventors have realized that it would be beneficial with a spectroscopy system that provides real time control of the focus of the irradiation on the sample, and which further more makes it easier to find a focus that generates best possible Raman spectrum with minimum fluorescence and background noise regardless of sample material being illuminated. The inventors have after insightful reasoning discovered that such a system may be realized by using tunable lenses. More particularly, the way a tunable lens may be controlled such as to allow for improved technical effects will be described below.

In the following, embodiments will be described where a spectroscopy system is provided for enabling improved Raman spectroscopy.

In the following, like reference numerals refer to like components, unless explicitly stated otherwise.

In FIG. 1 a schematic drawing of a spectroscopy system 10 for analyzing inelastic scattered light from an object O is illustrated. It should be noted that in this disclosure the terms sample and object may be used interchangeably unless explicitly stated otherwise.

The system 10 comprises an electromagnetic radiation source 11, a spectrograph unit 12, a tunable lens 13, a control unit 14, and at least one detector 15, 121.

The electromagnetic radiation source 11 emits electromagnetic radiation, e.g. light, passing through the tunable lens 13 affecting the focus position along the electromagnetic radiation path. The tunable lens 13 may be used in conjunction with a focusing lens FL, e.g. an aspherical focusing lens, being assembled adjacent to the tunable lens 13. The tunable lens 13 slightly change the optical power of or focal length of the focusing lens FL thereby allowing the focus position to move along the electromagnetic radiation path. The focused light hits the sample O and illuminates a spot of the sample resulting in a scattering of the light.

The tunable lens per se, or optionally assembled together with the focusing lens FL may be referred to as a tunable lens assembly 13 throughout the present specification.

It should be noted that in the schematic system of FIG. 1, the solid arrows show how the electromagnetic radiation travels through the system, whereas the dashed lines show the signals sent from or received by the control unit 14. Hence, FIG. 1 should not be interpreted as showing the exact position of each component in the system. Hence, it should be noted that the spectrograph unit 12 may be positioned on the same side of the object as the tunable lens assembly.

Most of the scattered light is typically received in the spectrograph unit 12. The spectrograph unit 12 may comprise a first detector 121. The first detector detects the scattered light and transmits it to the control unit 14.

The control unit 14 is connected to the tunable lens assembly 13 and may be arranged to control an optical characteristic operation setting of the tunable lens 13 by imposing a first setting control operation signal to the tunable lens 13.

The control unit 14 may be further configured to receive at least a first spectrum of the inelastic scattered electromagnetic radiation received from the detector 121 while using the first setting of the tunable lens assembly 13, and analyze the at least first spectrum by comparing an optical characteristic of the first spectrum to a reference.

The reference may be a predetermined level, such as, but not limited to, a maximum fluorescence level.

The control unit 14 may be further configured to decide whether the first setting should be changed to a second setting of the tunable lens assembly 13.

In some embodiments, the decision to change from the first setting to the second setting of the tunable lens assembly 13 may be based on a first level of fluorescence. E.g. if the level of fluorescence is detected to be higher than a first threshold in the first spectrum, then the control unit 14 may decide to change into the second setting. The second setting may in this scenario be associated with an increase in beam shape compared to the first setting.

The first threshold value may be predetermined. Alternatively, the first threshold value may be dynamically chosen based on the application. For example, different samples comprising different materials will result in different scattering spectrums. These may require different threshold values.

The determination to change from the first setting to the second setting by the control unit 14 may also be based on presence of a second level of fluorescence being lower than the first threshold value in the first spectrum. In such case, the second setting may be associated with a decreased beam shape compared to that of the first setting.

In some embodiments, the decision to change from the first setting to the second setting by the control unit 14 may be based on detecting no presence of fluorescence, or the detection of a third level of fluorescence being lower than the second level of fluorescence. In such case, the second setting may be associated with a second focal length or a second beam position compared to the first setting.

Some of the scattered light may be reflected back towards the electromagnetic radiation source 11. This may lead to reduced life time of the electromagnetic radiation source 11. In order to maximize the life time of the electromagnetic radiation source, a second detector 15 may be placed in front of the electromagnetic radiation source 11. This second detector 15 may be arranged to detect when the amount of back scattered light is in the risk of damaging the electromagnetic radiation source 11. The control unit 14 may in such case be configured to automatically control the optical characteristics of the tunable lens assembly 13 so that less light is backscattered towards the electromagnetic radiation source assembly 13. It should be appreciated that the second detector 15 may be omitted in some embodiments.

The control unit 14 may control the tunable lens by imposing a first setting control operation signal to the tunable lens assembly 13. The first setting control operation signal may comprise information relating to a first focal length, first beam shape, and/first beam position attainable by the tunable lens.

The tunable lens 13 may be tuned by applying a voltage or a current thereon. The applied voltage or the current will cause the tunable lens to change shape. The tunable lens may e.g. take on a concave or convex shape.

The electromagnetic radiation source 11 may be a laser or any other suitable radiation source, such as a LED depending on the application.

In the following, the term electromagnetic radiation source may be used interchangeably with the term laser unless explicitly disclosed.

Figure 2:
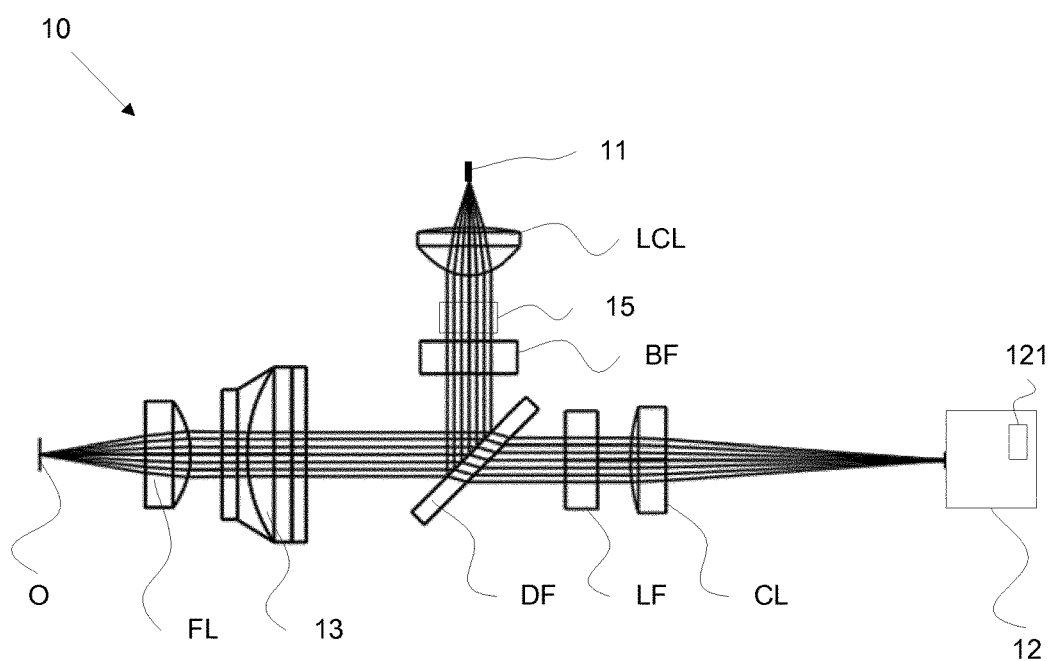
FIGS. 2 to 10 each show a respective embodiment of an optical setup of a spectroscopy system.

FIG. 2 shows an optical setup utilizing the components as described with reference to FIG. 1.

Figure 3:
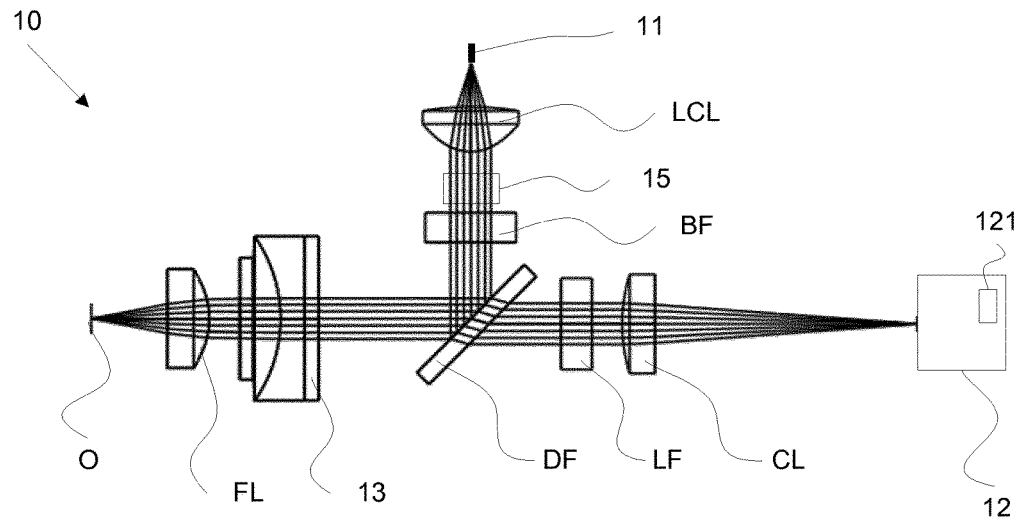

FIG. 3 illustrates another optical setup of the spectroscopy system 10, where a higher voltage than that applied in FIG. 2 is applied to the tunable lens 13, whereby in this case the focal length is shortened in comparison to that of FIG. 2. It may be observed from FIGS. 2 and 3 that the appearance of the tunable lens 13 differs between the two. As the tunable lens change its form from convex FIG. 2 to concave FIG. 3, it changes the optical power of FL and the focal length of the system changes from longer (FIG. 2) to shorter (FIG. 3) so that the laser focus moves (typically >1 mm) along the radiation path.

The tunable lens 13 may be an electrically tunable lens. The tunable lens 13 may comprise a container filled with an optical fluid which is sealed off with an elastic polymer membrane. When a current is applied to the tunable lens the current will flow through an electromagnetic actuator integrated into the lens and the pressure in the container is changed. This pressure change leads to a bulging of the membrane and thus a change in the lens focal length. Other tunable lens implementations are also in existence. For example, so called liquid tunable lenses could also be used.

Commercially available tunable lenses can rapidly and continuously change their shape from spherical to cylindrical and wedged as a function of the applied voltage or current.

The tunable lens 13 may e.g. have a focal tuning range of −500 to +50 mm.

In FIGS. 2 and 3 the alignment between laser 11, sample O, and spectrograph unit 12 is shown with orthogonal laser and optical collection paths.

On the laser path, i.e. the lines emanating from the laser 11, light is collimated by the laser collimation lens LCL. The light then passes through the band pass filter BF where it is filtered, and is then redirected by the dichroic filter DF towards the sample O. Prior to illuminating the sample O, the light is focused by the tunable lens assembly 13 including the focusing lens FL onto a spot of the sample O.

The minimum spot diameter for the laser is twice that of the beam waist and given by:

$$2w_o = f\theta_d \quad (1)$$

Where $\theta_d$ is the full angle divergence of the laser and f is the combined focal length achieved by the tunable lens assembly 13.

By varying the focal length of the focusing lens, the spot size can be controlled and the fluorescence background may be reduced.

On the collection path, i.e. the path were the lines are directed towards the collection lens CL, Raman light backscattered from the sample is collected and collimated by the tunable lens assembly 13, and transmitted through the dichroic filter DF and the long pass filter LF. The backscattered Raman light is then focused by the collection lens CL onto an opening of the spectrograph unit 12.

The band pass filter BF blocks all light that is not at the laser frequency, whereas the dichroic filter DF and long pass filter LF blocks all light at and above or below the laser frequency, depending on the Stokes shift. Thus, as far as possible it is ensured that only scattered light from the sample O reaches the spectrograph unit 12.

The tunable lens 13 is arranged at the focusing lens FL. The tunable lens is capable of, without comprising any moving parts, change it shape rapidly and continuously from a diverging surface to a converging surface as a function of an applied voltage or a current.

As the tunable lens 13 changes shape it changes the optical power of the focusing lens FL according to:

$$\phi = \phi_1 + \phi_2 - \phi_1\phi_2 d \quad (2)$$

where the optical power $\phi = 1/f$, where d is the distance between the tunable lens 13 and the focusing lens FL. Thus the focal length of the optical system can be fine adjusted.

The changed shape of the tunable lens 13 will either disperse or converge the incoming light from the laser 11. Thus, the focal spot of the focusing lens FL on the sample O may be tuned along a focal axis by at least 1 to 2 mm, and the complete sample area may be scanned.

The system furthermore makes it possible to identify each individual layer in a sample without having to manually move any part of the system, e.g. by scanning the sample at different depth levels, e.g. by changing the focal length 1 to 2 mm. It should be noted that the change in focal length depends on the actual focusing lens and tunable lens selected. Hence, larger or smaller changes than 1 to 2 mm are equally possible within the scope of the present invention depending on the specific lens specifications.

In order to identify each particular layer of a sample, e.g. object O as described with reference to FIGS. 2 and 3, the focus point is dynamically moved along the sample path illuminating one layer at time.

Another advantage of the spectrograph system comprising the tunable lens 13, is the possibility to automatically search for the optimal focus point on the sample for the strongest Raman signal.

The tunable lens 13 also makes it possible to dynamically change the sampling spot size during exposure to laser light and/or in between exposures in order to scan a larger area of the sample. This may increase the probability to obtain a Raman response for inhomogeneous and/or very small samples.

Figure 4:
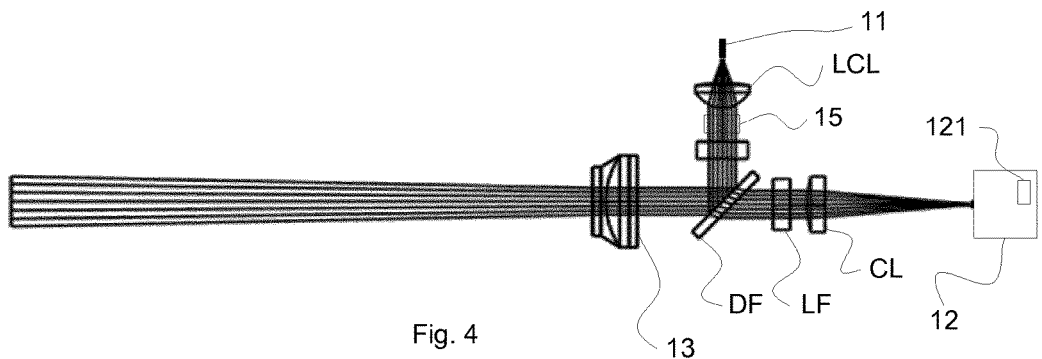
Figure 5:
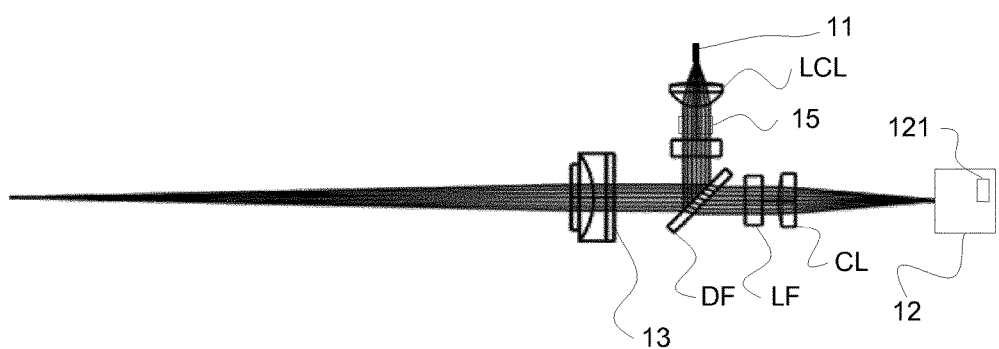

FIGS. 4 and 5 each show a spectrograph system 10 similar to that of FIGS. 2 and 3, in which a higher voltage from the control unit 14 is applied to the tunable lens 13 in FIG. 5 than in FIG. 4, resulting in a decreased focal length for the optical setup of FIG. 5. This will ease integration with existing optical systems, e.g. probe relay optics, by offering flexibility in light beam configuration.

The control unit 14 (not shown in FIGS. 2 to 10) is connected to the tunable lens 13, and is arranged to control an optical characteristic operation setting of the tunable lens by imposing a first setting control operation signal to the tunable lens 13. The first setting control operation signal may comprise information relating to a first focal length, beam shape, and/or beam position attainable.

When a second detector 15 is provided, the control unit 14 is further connected thereto for receiving at least a portion of the in-elastic scattered electromagnetic radiation from the object O while using the first setting of the electronically tunable lens 13. The control unit may further be arranged to analyze the detected portion of in-elastic scattered electromagnetic radiation by comparing an optical characteristic of the detected portion to a reference set at a level above which the durability of the electromagnetic radiation source 11 is adversely affected.

In the event that the optical characteristic is larger than the reference the control unit may further be arranged to transmit a second setting control operation signal to the tunable lens 13.

The optical characteristic may relate to at least one of: intensity, frequency, power spectrum, spectral density and/or time variance. The optical characteristic may also relate to a wavelength spectrum of in-elastic scattered electromagnetic radiation from the object. Moreover, the wavelength spectrum may correspond to a wavelength range associated with fluorescence.

The second setting control operation signal may comprise information relating to a second focal length, second beam shape and/or second beam position to reduce the magnitude of the optical characteristic detected by the detector when the electrically tunable lens 13 operates based on the second setting.

In some embodiments, measurements may be carried out on samples demanding a larger sample distance between the sample and the spectrograph unit. For example, it is typically advantageous to keep a distance on several cm to the sample when measuring explosives.

Figure 6:
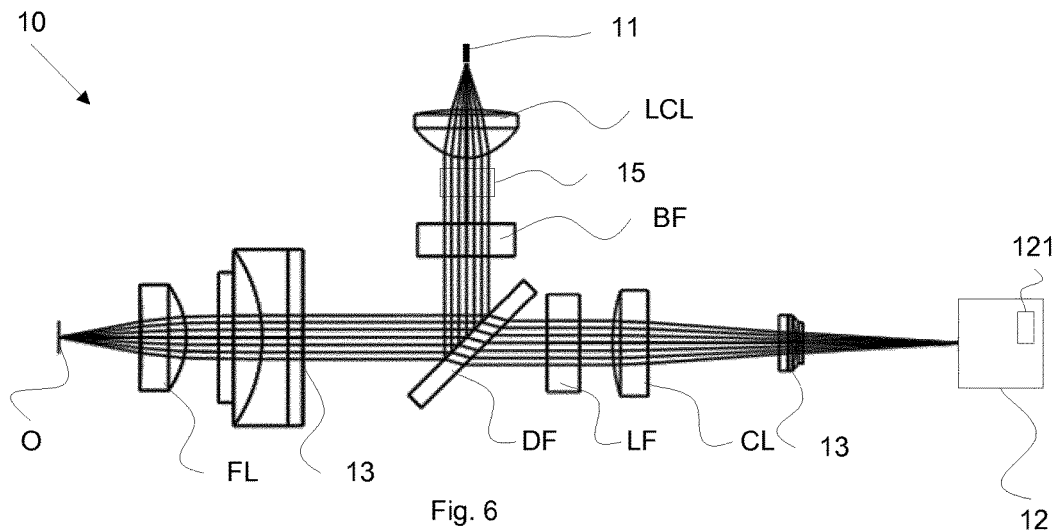

FIG. 6 illustrates a spectrograph system comprising two tunable lenses 13, one focusing light on the object and the other focusing light onto an entrance slit of the spectrograph unit 12. Here, the two tunable lenses 13 may be controlled simultaneously resulting in a better alignment between the sample and the entrance slit, respectively.

The shape of the opening of the spectrograph unit 12 is typically in the shape of a line or a slit. The typical shape of the focus point on the sample O is a circle or a point.

When the tunable lens is tuned to a spherical shape, the light is focused onto a point, whereas when the tunable lens is tuned to the cylindrical shape the light is focused onto a line. By having two tunable lenses the point/circle shape of the focus point on the sample O, i.e. the illuminated area of the sample O, may approach a slit shape when passing through the second tunable lens prior to the spectrograph unit 12. Thus, it is possible for the spectrograph unit to collect the maximum amount of scattered light at a minimum laser irradiation. The increased illumination area further helps avoid heating and high levels of fluorescence.

Figure 7:
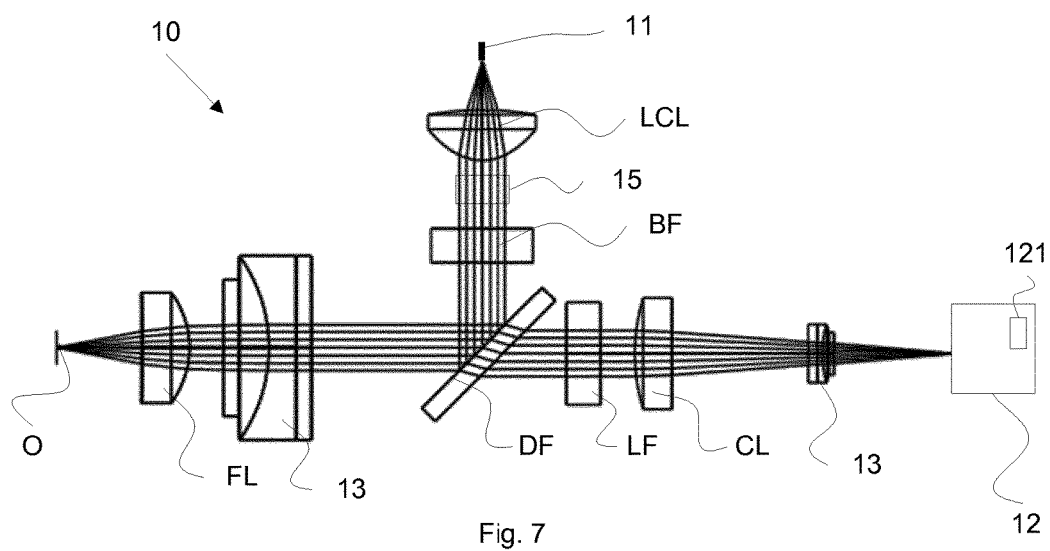

FIG. 7 shows a spectrograph system similar to that of FIG. 6 where the control operation settings for each tunable lens 13 have been changed. Here, the focal length of the rightmost tunable lens 13 has been decreased, e.g. by increasing the applied control operation setting applied said tunable lens 13.

Figure 8:
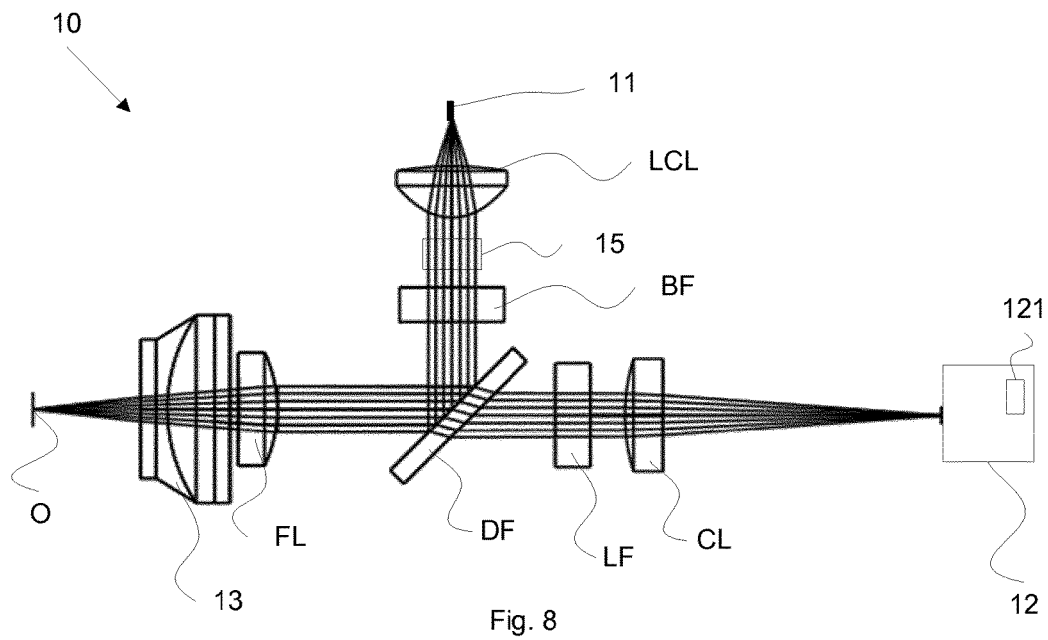
Figure 9:
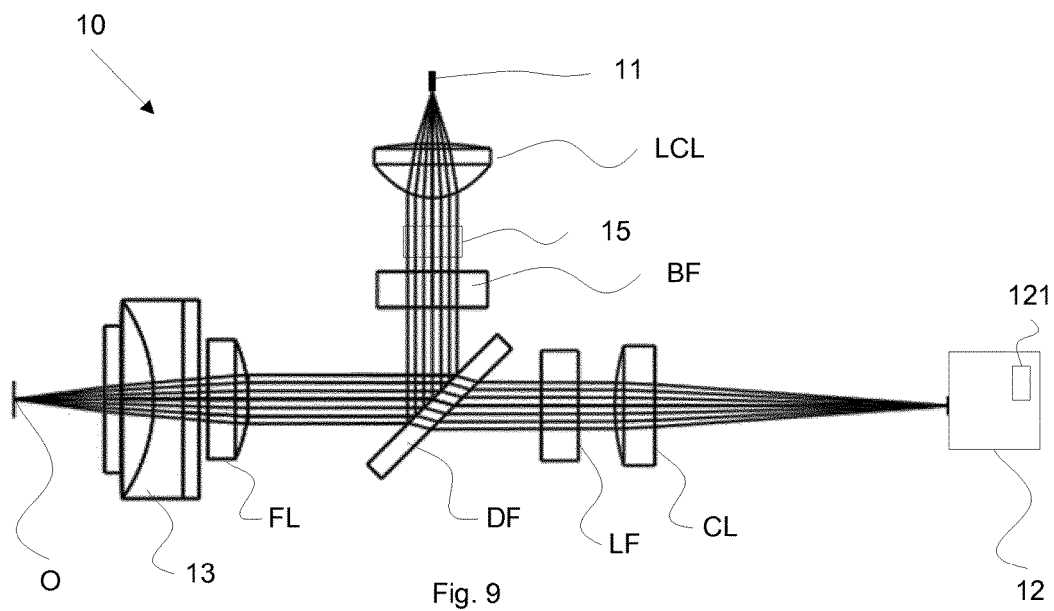

FIGS. 8 and 9 show two further respective spectrograph systems similar to that of FIGS. 2 and 3, wherein the tunable lens 13 is arranged between the object O and the focusing lens FL allowing for essentially the same technical advantages.

In an embodiment, the first and/or second setting control signal is included in a test scheme specifying a number of predetermined specific focal lengths, beam shapes or beam positions, respectively.

The control unit 14 may be further configured to transmit a number of setting control signals based on the test scheme containing a number of predetermined specific focal lengths. For each transmitted setting control signal the control unit then is arranged to store a wavelength spectrum in a memory, resulting in a number of stored test scheme spectra and analyze the number of stored test scheme spectra by comparing each stored test scheme spectrum to the other to identify differences between each stored test scheme spectrum, and in the event the identified differences exceeds a reference threshold. Moreover, the control unit 14 may be configured to make a decision that the object is non-homogenous along a longitudinal axis of the object.

In an embodiment, the control unit 14 is further configured to transmit a number of setting control signals based on the test scheme containing a number of predetermined beam shapes for a particular beam position. For each transmitted setting control signal the control unit is arranged to store a wavelength spectrum in a memory, resulting in a number of stored test scheme spectra and analyze the number of stored test scheme spectra by comparing each stored test scheme spectrum to the other to identify differences between each stored test scheme spectrum, and in the event the identified differences exceeds a reference. Moreover, the control unit is arranged to make a decision that the object is non-homogenous along a lateral axis of the object or along a normal to a plane containing the longitudinal axis and the lateral axis and at a longitudinal position of the object.

In an embodiment, the control unit 14 is further configured to transmit a number of setting control signals based on the test scheme containing a number of predetermined beam positions for a particular beam shape. For each transmitted setting control signal the control unit 14 is configured to store a wavelength spectrum in a memory, resulting in a number of stored test scheme spectra and analyze the number of stored test scheme spectra by comparing each stored test scheme spectrum to the other to identify differences between each stored test scheme spectrum, and in the event the identified differences exceeds a reference. Moreover, the control unit is arranged to make a decision that the object is non-homogenous along a lateral axis of the object or along a normal to a plane containing the longitudinal axis and the lateral axis and at a longitudinal position of the object.

Based on a decision is made that the object is non-homogenous along the lateral axis, the control unit 14 is arranged to transmit an further setting control signal to the tunable lens 13, wherein the further setting control signal comprises information relating to a beam shape producing a beam spot on the object having an increased extension along the lateral axis.

Based on a decision is made that the object is non-homogenous along the plane containing the longitudinal axis and the lateral axis the control unit 14 is arranged to transmit an further setting control signal to the electrically tunable lens, wherein the further setting control signal comprises information relating to a beam shape producing a beam spot on the object having an increased extension along the normal to the plane containing the longitudinal axis and the lateral axis.

In some embodiments, the longitudinal position of the object is the surface of the object.

Success in acquiring Raman spectra may depend more on noise levels and background than on actual signal strength. Typically the background may contain other detected photons than the Raman photons, i.e. other photons which arise from the laser and from the sample. In particular background may typically include luminescence of the sample or optics, such as fluorescence and/or thermal emission, or stray laser light which may include Rayleigh scattering, reflections from optics or dust, and the like.

Stray light typically includes any elastically scattered laser light which is not removed by filters but may be reduced by baffles and vanes.

To reduce the amount of stray light that reflects from the walls inside the probe mechanical body and its optical components, the optical probe assemblies of this invention may in some embodiments comprise a baffle system.

Figure 10:
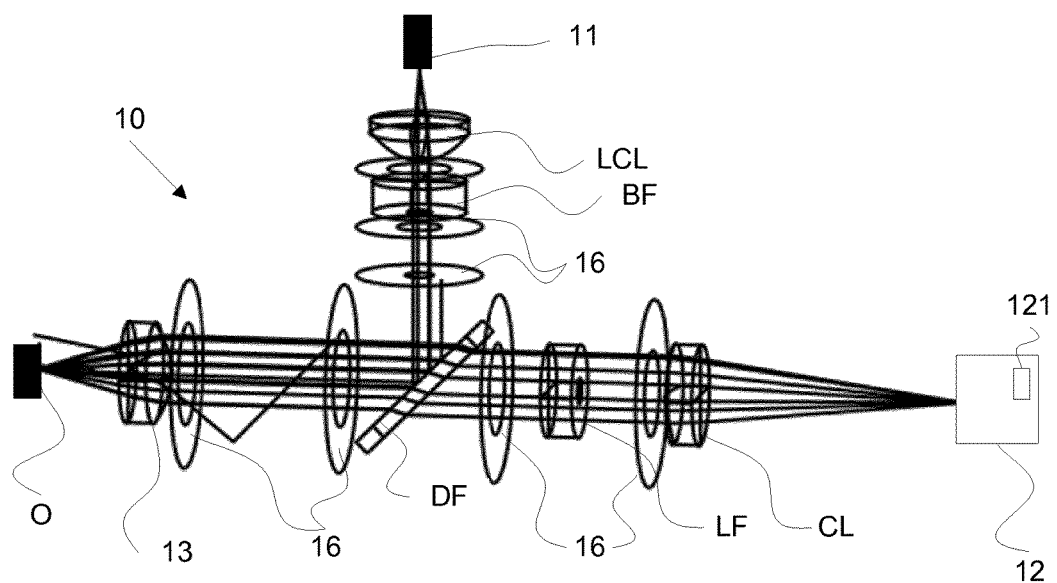

FIG. 10 illustrates a spectrograph system 10 being further provided with a number of sharp baffles 16 according to some embodiments. The spectrograph system of FIG. 10 may comprise corresponding features as those described in conjunction with FIGS. 1 to 9. The system comprises a number of sharp edge baffles 16 along the beam path of the system.

In some embodiments, each of the sharp edge baffles comprises a chamfered portion facing towards the detector. A technical effect associated herewith is that arranging the baffles in this manned tends to reduce the stray light propagating through the optical system since the incident light is not reflected by the chamfered portion.

The baffles 16 may be in the shape of cylindrical tubes having an inner diameter and an outer diameter. The outer diameter may be the same for all baffles 16 whereas the inner diameter of each baffle may be unique or at least varying from each other. Varied inner diameters ensure that no optical component of a probe comprised in the system may "see" the surfaces that are directly illuminated. The sharp edged baffles trap radiation as it bounces between the baffles and dissipate before reaching the detector. Thus, the detector is prevented from "seeing" a directly illuminated surface.

In FIG. 10 a divergent laser beam passes through a laser collimating lens LCL, e.g. the laser collimating lens as described in conjunction with FIGS. 2 to 9, and is redirected by a dichroic filter DF, e.g. the dichroic filter as described in FIGS. 2 to 9, towards a sample O. The baffles along the laser path attenuate back scattered radiation from the dichroic filter to the laser aperture. The positions of the baffles in the (x) and (y) plane is determined by the following:

$$x_{n+1} = (y_0 - y_{n+1})\frac{s}{y_0 - a} \qquad (3)$$

$$y_{n+1} = r - \frac{r+a}{r+z_n} \qquad (4)$$

$$z_n = 2a\left[r - y_0 + x_n \frac{y_0 - a}{s} \frac{y_0 + r}{y_0 + y_n}\right] \qquad (5)$$

Where $y_n$ is the inner radius of the baffle n at the distance $x_n$ from the outermost baffle at $x_0=0$. The outer radius of the baffle is r It should be appreciated that the positions of baffles 16 may be determined by the equations (3-5) along the optical axis of the spectrograph system 10. Hence, one could say that x defines a positions between baffles so that they are placed at specific distances from each other rather than randomly.

Reference has been made herein to various embodiments. However, a person skilled in the art would recognize numerous variations to the described embodiments that would still fall within the scope of the claims. For example, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A system for analyzing in-elastic scattered electromagnetic radiation from an object being irradiated by electromagnetic radiation, comprising
    an electromagnetic radiation source for emitting electromagnetic radiation onto the object;
    at least one detector for detecting at least part of the in-elastic scattered electromagnetic radiation from the object, the detector is arranged in a spectrograph unit for detecting a wavelength spectrum of in-elastic scattered electromagnetic radiation from the object;
    a tunable lens assembly comprising a tunable lens provided in the beam path between the electromagnetic radiation source and the object and arranged to project a beam of electromagnetic radiation emitted from the electromagnetic radiation source onto an area of the object and receive and collimate the in-elastic scattered electromagnetic radiation from the object; and
    a control unit connected to the tunable lens, and arranged to control the optical characteristic operation setting of the tunable lens assembly by imposing a first setting control operation signal to the tunable lens assembly, the first setting control operation signal comprising information relating to a first focal length, first beam shape, and/or first beam position attainable,
    the control unit is further connected to the at least one detector for receiving at least a first spectrum of the in-elastic scattered electromagnetic radiation from the object while using the first setting of the tunable lens assembly, wherein the control unit is arranged to:
analyze the detected portion of in-elastic scattered electromagnetic radiation by comparing an optical characteristic of the first spectrum to a reference and decide whether the first setting should be changed to a second setting of the tunable lens assembly, and in the event a decision to change the first setting to a second setting is taken the control unit is further configured to
transmit a second setting control operation signal associated with the second setting to the electrically tunable lens assembly, the second setting comprising information relating to a second focal length, second beam shape and/or second beam position attainable by the tunable lens assembly, wherein the decision to change to a second setting of the tunable lens assembly is based on:
the presence of a first level of fluorescence being higher than a predetermined threshold in the first spectrum, whereby the second setting is associated with an increased beam shape compared to that of the first setting,
the presence of a second level of fluorescence being lower than the predetermined level in the first spectrum, whereby the second setting is associated with a decreased beam shape compared to that of the first setting, or
the presence of no fluorescence or a third level of fluorescence being lower than a second level, whereby the second setting is associated with a second focal length or second beam position.

2. The system according to claim 1, wherein the optical characteristic relates to at least one of: intensity, frequency, power spectrum, spectral density and/or time variance.

3. The system according to claim 1, wherein the optical characteristic relates to a wavelength spectrum of in-elastic scattered electromagnetic radiation from the object.

4. The system according to claim 3, wherein the wavelength spectrum corresponds to a wavelength range associated with fluorescence.

5. The system according to claim 1, wherein the first and/or second setting control signal is included in a test scheme specifying a number of predetermined specific focal lengths, beam shapes or beam positions, respectively.

6. The system according to claim 5, wherein the control unit is further configured to:
transmit a number of setting control signals based on the test scheme containing a number of predetermined specific focal lengths; and for each transmitted setting control signal
store a wavelength spectrum in a memory, resulting in a number of stored test scheme spectra;
analyze the number of stored test scheme spectra by comparing each stored test scheme spectrum to the other to identify differences between each stored test scheme spectrum, and in the event the identified differences exceeds a reference threshold, the control unit is arranged to
make a decision that the object is non-homogenous along a longitudinal axis of the object.

7. The system according to claim 5, wherein the control unit is further configured to:
transmit a number of setting control signals based on the test scheme containing a number of predetermined beam shapes for a particular beam position; and for each transmitted setting control signal
store a wavelength spectrum in a memory, resulting in a number of stored test scheme spectra;
analyze the number of stored test scheme spectra by comparing each stored test scheme spectrum to the other to identify differences between each stored test scheme spectrum, and in the event the identified differences exceeds a reference, the control unit is arranged to
make a decision that the object is non-homogenous along a lateral axis of the object or along a normal to a plane containing the longitudinal axis and the lateral axis and at a longitudinal position of the object.

8. The system according to claim 5, wherein the control unit is further configured to:
transmit a number of setting control signals based on the test scheme containing a number of predetermined beam positions for a particular beam shape; and for each transmitted setting control signal
store a wavelength spectrum in a memory, resulting in a number of stored test scheme spectra;
analyze the number of stored test scheme spectra by comparing each stored test scheme spectrum to the other to identify differences between each stored test scheme spectrum, and in the event the identified differences exceeds a reference, the control unit is arranged to
make a decision that the object is non-homogenous along a lateral axis of the object or along a normal to a plane containing the longitudinal axis and the lateral axis and at a longitudinal position of the object.

9. The system according to claim 7, wherein the control unit, based on a decision that the object is non-homogenous along the lateral axis, is further configured to:
transmit an further setting control signal to the tunable lens assembly, wherein the further setting control signal comprises information relating to a beam shape producing a beam spot on the object having an increased extension along the lateral axis.

10. The system according to claim 7, wherein the control unit, based on a decision that the object is non-homogenous along the plane containing the longitudinal axis and the lateral axis, is further configured to:
transmit an further setting control signal to the tunable lens assembly, wherein the further setting control signal comprises information relating to a beam shape producing a beam spot on the object having an increased extension along the normal to the plane containing the longitudinal axis and the lateral axis.

11. The system according to claim 5, wherein the longitudinal position of the object is a position at the surface of the object.

12. The system according to claim 1, wherein the at least one further detector is arranged in the beam path between the object and the electromagnetic radiation source for detecting an optical characteristic having a level above which the durability of the electromagnetic radiation source is adversely affected.

13. A system for analyzing in-elastic scattered electromagnetic radiation from an object being irradiated by electromagnetic radiation, comprising
an electromagnetic radiation source for emitting electromagnetic radiation onto the object;
at least one detector for detecting at least part of the in-elastic scattered electromagnetic radiation from the object, the at least one detector is arranged to detect a level of electromagnetic radiation scattered from the object towards the electromagnetic radiation source;

a tunable lens assembly comprising a tunable lens provided in the beam path between the electromagnetic radiation source and the object and arranged to project a beam of electromagnetic radiation emitted from the electromagnetic radiation source onto an area of the object; and a control unit connected to the tunable lens, and arranged to control the optical characteristic operation setting of the tunable lens assembly by imposing a first setting control operation signal to the tunable lens assembly, the first setting control operation signal comprising information relating to a first focal length, beam shape, and/or beam position attainable, the control unit is further connected to the at least one detector for receiving at least a portion of the in-elastic scattered electromagnetic radiation from the object while using the first setting of the tunable lens assembly wherein the control unit is arranged to:

analyze the detected portion of in-elastic scattered electromagnetic radiation by comparing an optical characteristic of the detected portion to a reference set at a level above which the durability of the electromagnetic radiation source is adversely affected, and in the event the optical characteristic is larger than the reference the control unit is arranged to transmit a second setting control operation signal to the tunable lens assembly, the second setting control operation signal comprising information relating to a second focal length, second beam shape and/or second beam position to reduce the magnitude of the optical characteristic detected by the detector when the electrically tunable lens assembly operates based on the second setting.

14. The system according to claim 13, wherein the optical characteristic relates to at least one of: intensity, frequency, power spectrum, spectral density and/or time variance.

15. The system according to claim 13, wherein one of the at least one further detector is arranged in a spectrograph unit for detecting a wavelength spectrum of in-elastic scattered electromagnetic radiation from the object.

16. The system according to claim 1, wherein the electromagnetic radiation source is a laser.

17. The system according to claim 1, further comprising one dichroic filter (DF) arranged in the beam path between the electromagnetic radiation source and the object and between the beam path between the object and the at least one detector.

18. The system according to claim 1, further comprising a number of sharp edge baffles along the beam path of the spectrograph system.

19. The system according to claim 18, wherein each sharp edge baffle has a chamfered portion facing towards the detector.

* * * * *